US009622216B2

(12) United States Patent
Hansen et al.

(10) Patent No.: US 9,622,216 B2
(45) Date of Patent: Apr. 11, 2017

(54) METHOD AND SYSTEM FOR LOW RATE MAC/PHY FOR 60 GHZ TRANSMISSION

(75) Inventors: Christopher Hansen, Sunnyvale, CA (US); Jeyhan Karaoguz, Irvine, CA (US)

(73) Assignee: Avago Technologies General IP (Singapore) Ptd. Ltd, Singapore (SG)

(*) Notice: Subject to any disclaimer, the term of this patent is extended or adjusted under 35 U.S.C. 154(b) by 1251 days.

(21) Appl. No.: 11/849,812

(22) Filed: Sep. 4, 2007

(65) Prior Publication Data
US 2008/0310354 A1 Dec. 18, 2008

Related U.S. Application Data

(60) Provisional application No. 60/943,995, filed on Jun. 14, 2007.

(51) Int. Cl.
*H04W 4/00* (2009.01)
*H04W 72/04* (2009.01)
(Continued)

(52) U.S. Cl.
CPC ....... *H04W 72/04* (2013.01); *H04W 72/0406* (2013.01); *H04W 76/04* (2013.01); *H04W 84/18* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 5,790,587 A | * | 8/1998 | Smith et al. ............ 375/147 |
| 6,049,721 A | * | 4/2000 | Serizawa et al. ........ 455/509 |

(Continued)

FOREIGN PATENT DOCUMENTS

| | | |
|---|---|---|
| WO | WO 2007/051033 | 5/2007 |
| WO | WO 2008/088189 | 7/2008 |

OTHER PUBLICATIONS

European Search Report corresponding to European Patent Application Serial No. 08007226.7-2412, dated Nov. 17, 2008, 3 pages.

(Continued)

*Primary Examiner* — Michael J Moore, Jr.
(74) *Attorney, Agent, or Firm* — Garlick & Markison; Edward J. Marshall (57) ABSTRACT

One or more coordinating devices may be utilized to control high speed data transmission among a plurality of wireless devices utilizing 60 GHz for high speed data transmission. Control messages may be sent and/or received between each of the plurality of wireless devices and the one or more coordinating devices utilizing low rate control connections via available secondary physical layers. The secondary physical layers may comprise Bluetooth, 802.11, and/or UWB physical layers. The controlling may comprise time coordination, frequency coordination, and/or spatial coordination that may enable the wireless devices to align and/or position directional antenna that may be utilized to perform the 60 GHz high speed data transmission. The wireless devices may utilize the low rate control connections to communicate reporting messages to the one or more coordinating devices. The reporting information may enable the one or more coordinating devices to manage available resources in the plurality of wireless devices.

26 Claims, 6 Drawing Sheets

(51) Int. Cl.
*H04W 76/04* (2009.01)
*H04W 88/06* (2009.01)
*H04W 84/18* (2009.01)

(56) References Cited

U.S. PATENT DOCUMENTS

| | | | |
|---|---|---|---|
| 6,850,741 B2* | 2/2005 | Lei et al. | 455/101 |
| 7,349,436 B2* | 3/2008 | Maltsev et al. | 370/471 |
| 7,555,556 B2* | 6/2009 | Motoyama | 709/227 |
| 7,720,036 B2* | 5/2010 | Sadri et al. | 370/338 |
| 7,978,064 B2* | 7/2011 | Zdeblick et al. | 340/539.12 |
| 8,699,421 B2* | 4/2014 | Shao | H04W 28/26 370/329 |
| 8,826,348 B2* | 9/2014 | Qin | H04W 52/50 725/82 |
| 2004/0199616 A1* | 10/2004 | Karhu | 709/221 |
| 2004/0217948 A1 | 11/2004 | Kawasaki et al. | |
| 2006/0166683 A1 | 7/2006 | Sharma | |
| 2007/0099668 A1 | 5/2007 | Sadri et al. | |
| 2007/0286107 A1* | 12/2007 | Singh | H04N 21/43615 370/312 |
| 2007/0297365 A1* | 12/2007 | Li et al. | 370/331 |
| 2008/0175197 A1* | 7/2008 | Shao | H04W 72/02 370/329 |
| 2008/0176561 A1* | 7/2008 | Shao | H04W 8/005 455/434 |
| 2011/0013611 A1* | 1/2011 | Chou | H04W 24/00 370/338 |

OTHER PUBLICATIONS

Smulders, "Exploiting the 60 GHz Band for Local Wireless Multimedia Access: Prospects and Future Directions." IEEE Communications Magazine, Jan. 2002.
European Patent Office, Communication pursuant to Article 94(3) EPC, in Application No. 08 007 226.7-2412, dated Jul. 26, 2011.

* cited by examiner

METHOD AND SYSTEM FOR LOW RATE MAC/PHY FOR 60 GHZ TRANSMISSION

CROSS-REFERENCE TO RELATED APPLICATIONS/INCORPORATION BY REFERENCE

This patent application makes reference to, claims priority to and claims benefit from U.S. Provisional Application Ser. No. 60/943,995 filed on Jun. 14, 2007.

This application also makes reference to U.S. patent application Ser. No. 11/584,213 filed on Oct. 20, 2006.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable].

FIELD OF THE INVENTION

Certain embodiments of the invention relate to data transmission in wireless devices. More specifically, certain embodiments of the invention relate to a method and system for a low rate MAC/PHY for 60 GHz transmission.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

Other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intend to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services include such features as text messaging, video streaming, web browsing . . . etc.

Many devices nowadays, including such devices as cellular phones, PDA's, and/or laptops, comprise wireless capabilities; including the Bluetooth protocol, which may be suitable for operations pertaining to interacting with other wireless devices that may be located within Bluetooth interface operational range. While wireless devices may have initially been intended solely for uses consistent with peer-to-peer communication, other applications and uses have appeared and/or gained popularity in recent years. These non-communicative operations may comprise audio/video applications such as still and moving picture recording application and voice recording applications. Though the Bluetooth interface may be suitable and/or optimal for communicative operations, its transmission data rates may prevent and/or limit the use of the Bluetooth interface for applications that may necessitate high transmission data rates, for example, video streaming.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a low rate MAC/PHY for 60 GHz transmission, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a low rate MAC/PHY for 60 GHz transmission. In various embodiments of the invention, each of a plurality of wireless devices may comprise a 60 GHz interface, which may be utilized for high speed data transmission, and a plurality of other available secondary physical interfaces. The plurality of available secondary physical layers may comprise Bluetooth, WLAN (802.11), and/or Ultra Wideband (UWB) layers. One or more of the plurality of wireless may be enabled as coordinating devices, which may be utilized to control high speed data transmission by the plurality of wireless devices. Low rate control connections may be established between each of plurality of wireless devices and the one or more coordinating devices. The low rate control connection may be established via the available secondary physical layers. The low rate control connections may be utilized to send and/or receive control messages that enable the coordinating devices to perform time coordination, frequency coordination, and/or spatial coordination of the plurality of wireless devices. The coordinating devices may enable the wireless devices to align and/or position directional antennas that may be utilized to perform the 60 GHz high data transmission to prevent interference among the wireless devices during 60 GHz high data transmissions.

The wireless devices may utilize the low rate control connections to communicate reporting messages to the one or more coordinating devices. The reporting messages may comprise information pertaining to availability of the resources within each of plurality of wireless devices, which may be utilized to facilitate 60 GHz data transmission. The reporting information may enable the coordinating devices to manage available resources in the plurality of wireless devices by maintaining, for example, tables of current available resources within the plurality of wireless devices, and/or to deallocate and/or allocate resources during 60 GHz high speed data transmissions.

Figure 1:
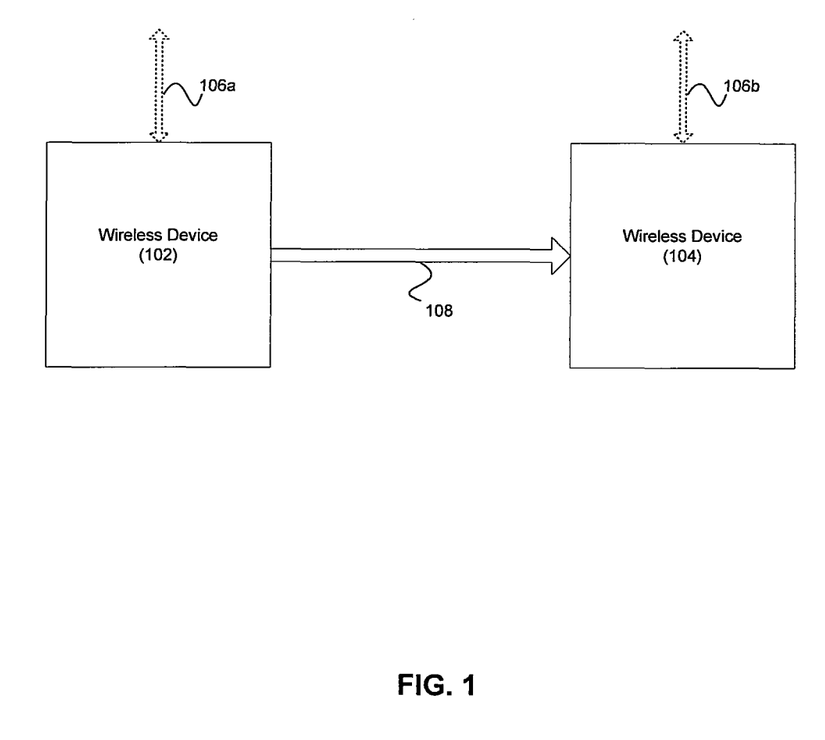
FIG. 1 is a block diagram illustrating two exemplary wireless devices that utilize a 60 GHz connection for high speed data while utilizing a second physical layer for low rate control messaging, which my be utilized in accordance with an embodiment of the invention.

FIG. 1 is a block diagram illustrating two exemplary wireless devices that utilize a 60 GHz connection for high speed data while utilizing a second physical layer for low rate control messaging, which my be utilized in accordance with an embodiment of the invention. Referring to FIG. 1, there is shown wireless devices 102 and 104, low rate control connections 106a and 106b, and a high speed data connection 108.

The wireless device 102 may comprise suitable logic, circuitry and/or code that may enable data transmission via the high speed data connection 108. Additionally, the wireless device 102 may comprise suitable logic, circuitry, and/or code that may enable utilizing plurality of wireless protocols for low rate control messaging. For example, the wireless device 102 may enable control messaging via Bluetooth (IEEE 802.15), WLAN (IEEE 802.11), Ultra Wideband (UWB), and/or other wireless protocols. The wireless device 104 may comprise components and/or functionality that may be substantially similar to the wireless device 102.

The wireless devices 102 and 104 may also comprise suitable logic, circuitry and/or code that may enable performing additional non-communication operations that may necessitate generation and/or transmission of large data files. The invention may not be limited to a specific type of devices, but may comprise for example, a general purpose processing device, a specialized processing device, and/or a specialized peripheral device which may be enabled to perform various jobs and/or tasks that may be requested by other wireless device in operational proximity. For example, the wireless device 102 may comprise a digital camera and/or audio recorder that may enable generation and/or transmission of video streaming and/or audio recordings. The wireless device 104 may comprise a personal computer (PC), a high-definition television (HDTV) set, a printer/scanner/fax device, a dedicate memory storage device, and/or a digital video recorder device. For example, the wireless device 104 may comprise a home PC that may be more capable or suitable of performing processing and/or storage operations of large data files than the wireless device 102 due to more powerful processing subsystems and/or increased memory space compared to the wireless device 102. Such home PC may be better suited to perform processing and/or storage intensive tasks that otherwise would have to be performed in the wireless device 102. Similarly, a networked HDTV monitor may be more suitable for display high definition multimedia content rather than the wireless device 102.

The low rate control connections 106a and 106b may comprise a radio and/or wireless link that may based on wireless protocol comprising Bluetooth, UWB, and/or 802.11. The high speed data connection 108 may comprise a radio and/or wireless link between the wireless devices 102 and 104 that is based on 60 GHz protocol and/or interface. Additionally, the low rate control connections 106a and/or 106b, and/or the 60 GHz high speed data connection may comprise the physical layers (PHY) and medium access control (MAC) layers functioning in wireless devices 102 and/or 104 to facilitate communication via the corresponding radio and/or wireless link. The PHY layer corresponds to the physical layer within the Open System Interface (OSI) model, which may enable transmitting raw bits via communication links. The MAC layer correspond to the medium access control sub-layer of the Data Link layer within the OSI model; the MAC layer may enable controlling access to shared media networks, and may comprise addressing and/or channel control operations.

In operations, the wireless device 102 may need to perform high speed data transmission. For example, where large video files may be generated in the wireless device 102, the wireless device 102 may attempt to transmit the generated video files to the wireless device 104 wherein the wireless device 104 may be more suitable for storing and/or playing these video files. Both wireless devices 102 and 104 may be enabled to utilize the 60 GHz protocol for high speed data transmission. The 60 GHz interface/protocol may enable high speed data transmission that may range from 2 to 10 Gbps (Gigabit per second). Consequently, the 60 GHz interface may be utilized to establish the high speed data connection 108. The wireless device 102 may utilize the high speed data connection 108 to perform the data transmission to the wireless device 104.

In addition to data transmission, the wireless devices 102 and 104 may be enabled to transmit and/or to receive control messages. The control messages may enable allocation, deallocation, and/or reallocation of resources utilized during the high speed data transmission. For example, the control messages may be utilized to assign channels and/or timeslot for transmitting and/or receiving data frames via the 60 GHz interface. While the wireless device 102 and 104 may utilize the 60 GHz to transmit and/or receive the control messages, other available wireless protocols may also be utilized to transmit and/or receive the control messages. For example, the wireless device 102 may utilize Bluetooth interface, WLAN interface, and/or UWB interface to establish the low rate control connection 106a. Similarly, the wireless device 104 may utilize Bluetooth interface, WLAN interface, and/or UWB interface to establish the low rate control connection 106b. The wireless device 102 and 104 may then utilize the low rate control connections 106a and 106b, respectively, to transmit and/or receive control messages pertaining to the high speed data transmission via the high speed data connection 108.

Figure 2:
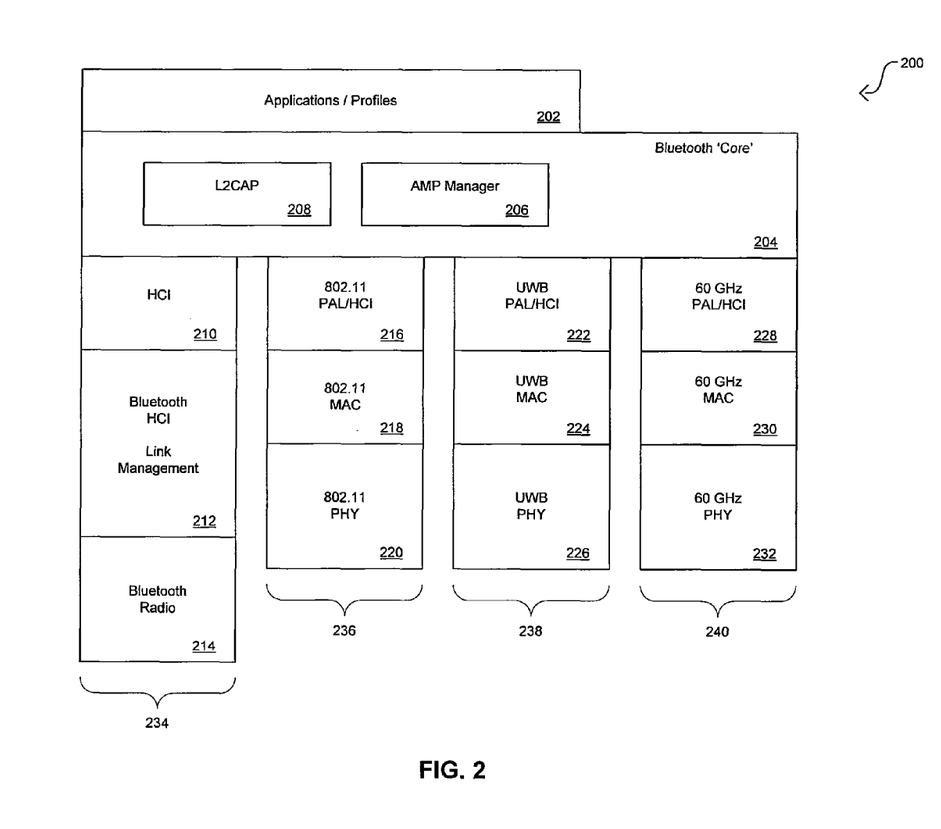
FIG. 2 is a block diagram illustrating a protocol stack diagram for Bluetooth-based wireless device that enables utilizing different physical layers for data and control transmissions, which may be utilized in accordance with an embodiment of the invention.

FIG. 2 is a block diagram illustrating a protocol stack diagram for Bluetooth-based wireless device that enables utilizing different physical layers for data and control transmissions, which may be utilized in accordance with an embodiment of the invention. Referring to FIG. 2, there is shown a Bluetooth stack 200 that may comprise applications/profiles layer 202, and a Bluetooth core 204. The Bluetooth core 204 may comprise a Logical Link Control and Adaptation Protocol (L2CAP) 206, and an alternate MAC/PHY Manager (AMP) 208. There is also shown a Bluetooth interface 234, an 802.11 interface 236, an ultra-wide band (UWB) interface 238, and a 60 GHz interface 240. The Bluetooth interface 234 may comprise a Bluetooth HCI interface 210, an HCI link management block 212, and a Bluetooth radio block 214. The 802.11 interface 236 may comprise an 802.11 PAL/HCI block 216, an 802.11 MAC 218, and an 802.11 PHY 220. The ultra-wide band (UWB) interface 238 may comprise an UWB PAL/HCI block 222, an UWB MAC 224, and an UWB PHY 226, The 60 GHz interface 240 may comprise a 60 GHz PAL/HCI block 228, a 60 GHz MAC 230, and a 60 GHz PHY 232. The 802.11 interface 234, the ultra-wide band (UWB) interface 238, and the 60 GHz interface 240 may be referred to as alternate interfaces.

The Bluetooth core 204 may be a link layer interface for Bluetooth communications. The Bluetooth core 204 may enable utilizing the Bluetooth interface 234 in instances where the Bluetooth radio 214 may be utilizes to transmit and/or receive data. The AMP 208 may enable connecting alternative interfaces that may incorporate non-Bluetooth MAC/PHY below the Bluetooth core layer to operate the Bluetooth applications and profiles at the top. In instances where other MAC/PHY interfaces may be utilized, a protocol adaptation layer/host controller interface (PAL/HCI) layers for each of the MAC/PHY interfaces may be utilized to enable utilizing non-Bluetooth radio interfaces to communicate data corresponding to applications running within the applications/profiles layer 202.

In operations, the Bluetooth stack 200 may be enabled to setup a data transmission session that may utilize a 60 GHz physical layer for high speed data transmission. The Bluetooth stack 200 may enable utilizing Bluetooth operations comprising discovery, pairing, and/or security key setup. During a discovery process in Bluetooth, a Bluetooth capable device that may be located in the neighborhood of another Bluetooth capable may be able to recognize each other. During a pairing process in Bluetooth, two Bluetooth-capable devices may decide that they want to communicate with each other and they may establish a secure key and start sharing information with each other. The pairing process may be performed over legacy Bluetooth radio. For example, the wireless devices 102 and 104 may utilize the Bluetooth core 204, the Bluetooth HCI 210, the Bluetooth HCI link management layer 212, and the Bluetooth radio 214 in performing discovery and/or pairing operations.

However, for high speed data transmissions, the Bluetooth interface may not sufficiently enable performing the required data transmission. Instead, the 60 GHz interface may be utilized to perform high speed data transmission. An application running on top of the Bluetooth stack 200, within the applications/profiles layer 202 may send the transmitted data. Consequently, the Bluetooth core 204 may enable transmission of the data wherein use of secondary, non-Bluetooth, physical layers may be made transparent. For example, the AMP manager 206 may enable managing and/or controlling data transmission via the 60 GHz interface. Within the 60 GHz PAL/HCI layer 228, the HCI functionality may be enabled to power the PAL functionality, and one or more data frames or packets that are output from the L2CAP layer 208 may be aggregated into large frames to fit into the 60 GHz MAC layer. The PAL layer may be enabled to aggregate frames received from the L2CAP layer. The PAL layer may be enabled to present an assessment of the channel quality to the AMP manager 206.

During data transmission via the 60 GHz interface, control messages pertaining to the data transmission may be transmitted and/or to received. The control messages may enable allocation, deallocation, and/or reallocation of resources utilized during the high speed data transmission. For example, the control messages may be utilized to assign channels and/or timeslot for transmitting and/or receiving data frames via the 60 GHz interface. Applications running on top of the Bluetooth stack 200, within the applications/profiles layer 202, may send and/or receive the control messages. Consequently, the Bluetooth core 204 may enable transmission and/or reception of the control messages. While the control message may be sent and/or received via the legacy Bluetooth radio 214 utilizing the Bluetooth HCI 210 and the Bluetooth HCI Link Manager 212, other available wireless protocol may also be utilized. For example, the AMP manager 206 may enable managing transmission and/or reception of control message via the WLAN (802.11) and/or UWB interfaces. Within the 802.11 PAL/HCI layer 216, the HCI functionality may be enabled to power the PAL functionality, and one or more control frames or packets that are output from the L2CAP layer 208 may be aggregated into large frames to fit into the 802.11 MAC layer 218. The transmission and/or reception of control frames may be performed via the 802.11 PHY layer (radio) 220. The PAL layer may be enabled to aggregate frames received from the L2CAP layer. The PAL layer may be enabled to present an assessment of the channel quality to the AMP manager 206. Similarly, within the UWB PAL/HCI layer 222, the HCI functionality may be enabled to power the PAL functionality, and one or more control frames or packets that are output from the L2CAP layer 208 may be aggregated into large frames to fit into the UWB MAC layer 224. The transmission and/or reception of control frames may be performed via the UWB PHY layer (radio) 226. The PAL layer may be enabled to aggregate frames received from the L2CAP layer. The PAL layer may be enabled to present an assessment of the channel quality to the AMP manager 206.

Figure 3:
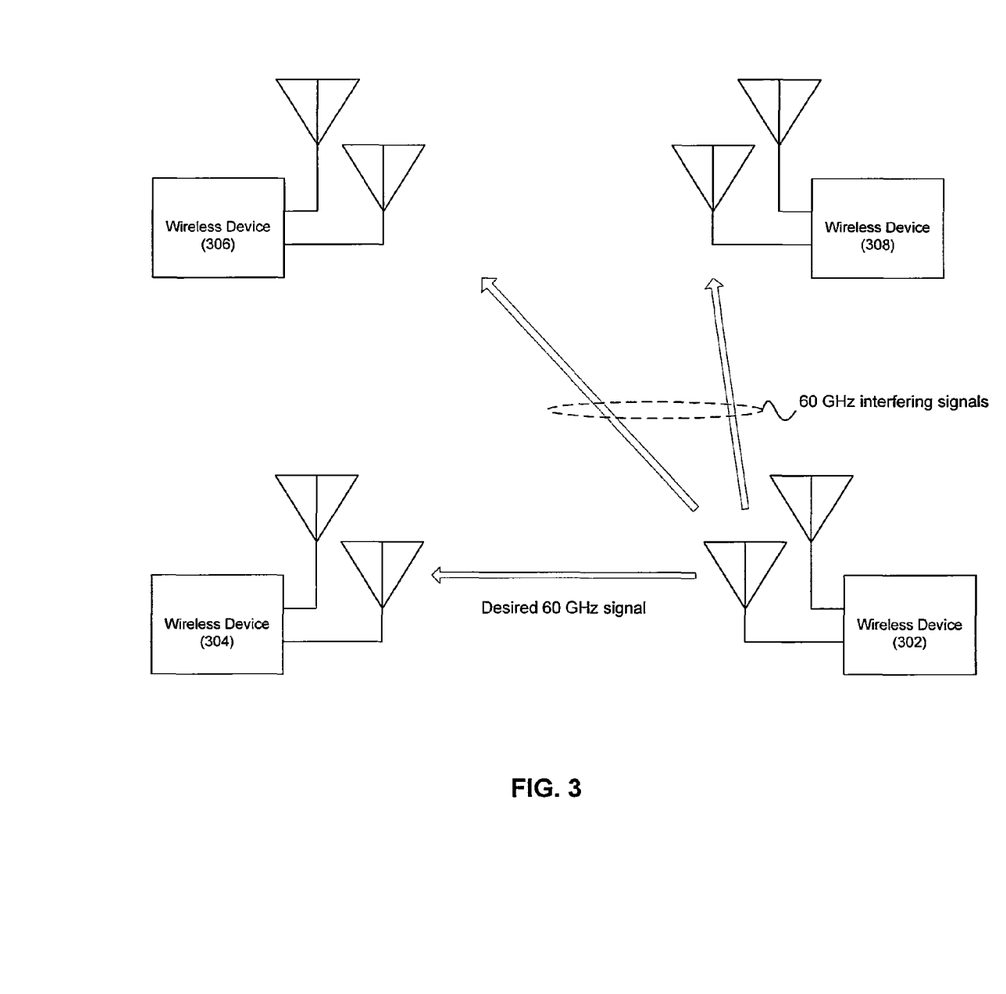
FIG. 3 is a block diagram illustrating plurality of wireless devices utilizing 60 GHz for high speed data transmission, in accordance with an embodiment of the invention.

FIG. 3 is a block diagram illustrating plurality of wireless devices utilizing 60 GHz for high speed data transmission, in accordance with an embodiment of the invention. Referring to FIG. 3, there is shown a plurality of wireless devices 302, 304, 306, and 308.

The wireless devices 302, 304, 306, and 308 may comprise components and/or functionality that may be substantially similar to the wireless devices 102 and/or 104.

In operation, where multiple wireless devices are present within operational proximity of each other, it may be necessary to coordinate transmissions in order to prevent interference. Some wireless local area networks, such as 802.11, may rely on the fact that stations may incorporate omni-directional antennas, and consequently may be enabled to receive transmission from other stations, which may be referred to as carrier sense multiple access with collision avoidance (CSMA/CA). Alternatively, the 60 GHz PHY layers of the wireless devices may incorporate directional antennas in the desired transmission path for high speed communication. In one embodiment of the invention, multiple wireless devices in one location may employ directional antennas to achieve antenna gain for 60 GHz. A hidden node problem may be created where different wireless devices may not be able to hear each other at 60 GHz and may create interference with each other.

With directional antennas there may be one or more problems, for example, a transmitting/receiving pair may not be able to communicate effectively until they have pointed or adapted their antennas to point at each other. Even after pointing or adapting their antennas, the pair may still, unknowingly, create interference to other wireless devices. For example, where the wireless devices 302 and 304 utilize directional antenna for high speed data transmission, the two devices may need to be aligned to ensure that the data transmitted from the wireless device 302 may be received by the wireless device 304. Additionally, even with directional transmission, the desired 60 GHz signal between the wireless devices 302 and 304 may still cause interference with the wireless devices 306 and 308. Consequently, transmission coordination may be necessary.

In accordance with various embodiments of the invention, 60 GHz high speed data transmissions may be achieved with an omni-directional system. For example, lower rate, 2.4 or 5 GHz systems may be preferable as they may not create interference on the 60 GHz band. Exemplary methods for coordinating transmission may comprise alternate channel selection or frequency coordination, time coordination where different wireless devices may be assigned different time slots, and/or spatial coordination via adjustments to antenna pointing or antenna weights.

During frequency coordination, for example, a coordinator may be coupled to two wireless devices that may communicate through this coordinator. The two wireless devices may connect through the coordinator to communicate data with each other. In another embodiment, the two wireless devices may communicate data to each other directly bypassing the coordinator. If multiple pairs of wireless devices communicatively coupled to the coordinator try to bypass the coordinator, the coordinator may assign them to be on different channels to mitigate or prevent interference with each other. The coordinator may maintain a table of wireless devices on each channel and to avoid interference. During time coordination, a coordinator may be enabled to coordinate the plurality of wireless devices in time. In this case, some of the wireless devices may be able to communicate with each other, and some of the wireless devices may not be able to communicate with each other. In an exemplary embodiment of the invention, the coordinator may be enabled to maintain a table of time slots and frequency slots to determine potentially when different wireless device pairs may be allowed to use the 60 GHz connection. During spatial coordination, a coordinator may point or establish the connection between devices using adaptive antenna or using steerable antenna array. The coordinator may provide feedback regarding the amount of interference created by the wireless devices with other pairs of wireless devices with their antenna. The wireless devices may be enabled to adjust the antenna to eliminate interference. Multiple transmissions may be utilized to adapt and/or configure antennas to a solution that may allow every wireless device to achieve its desired connection.

Figure 4:
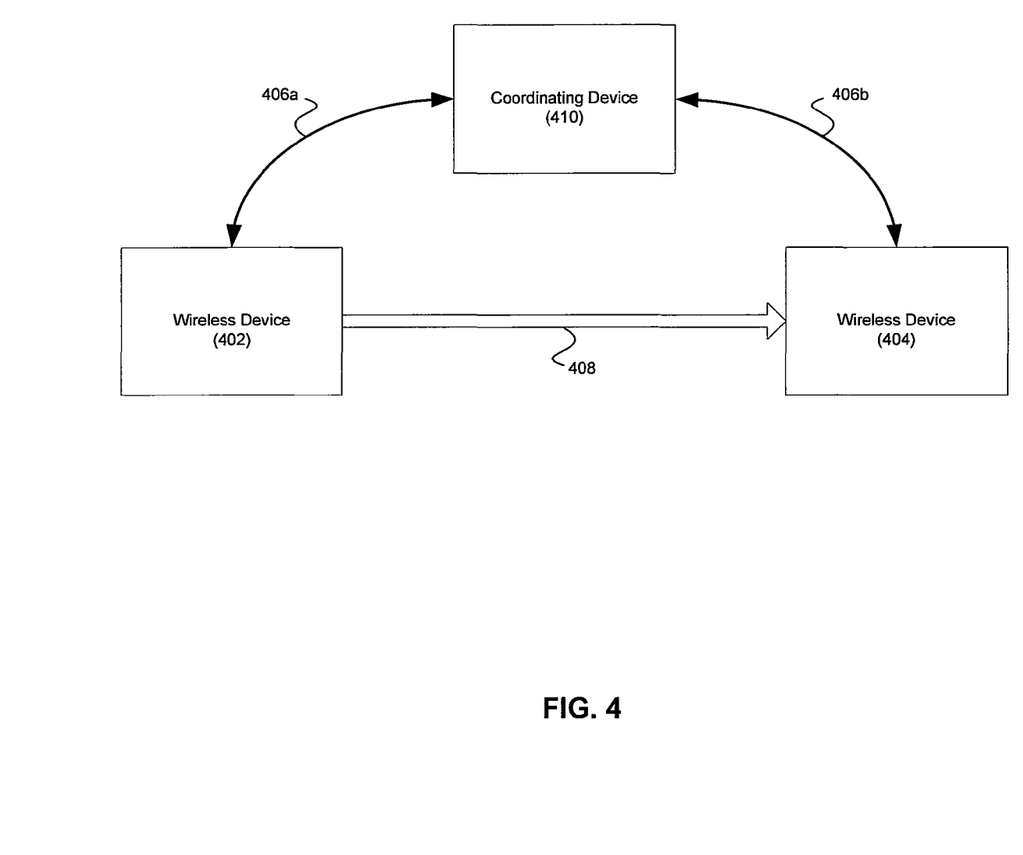
FIG. 4 is a block diagram illustrating exemplary wireless devices utilizing a 60 GHz connection for high speed data, with a coordinating device utilizing a secondary physical layer for low rate control messaging with the wireless devices, in accordance with an embodiment of the invention.

FIG. 4 is a block diagram illustrating exemplary wireless devices utilizing a 60 GHz connection for high speed data, with a coordinating device utilizing a secondary physical layer for low rate control messaging with the wireless devices, in accordance with an embodiment of the invention. Referring to FIG. 4, there is shown wireless devices 402 and 404, low rate control connections 406a and 406b, 60 GHz high speed data connection 408, and a coordinating device 410.

The wireless device 402 and 404 may comprise components and/or functionality that may be substantially similar to the wireless devices 102 and 104. The coordinating device 410 may comprise suitable logic, circuitry and/or code that may enable coordinating between device 402 and 404 during high speed data transmission via 60 GHz connections. For example, the coordinating device 410 may comprise an access point, a set-top box, a gaming console, and/or residential gateway personal computer.

In operation, the wireless device 402 may need to perform high speed data transmission. For example, where large video files may be generated in the wireless device 402, the wireless device 402 may attempt to transmit the generated video files to the wireless device 404 wherein the wireless device 404 may be more suitable for storing and/or playing these video files. Both wireless devices 402 and 404 may be enabled to utilize the 60 GHz protocol for high speed data transmission. The wireless device 402 may utilize the 60 GHz high speed data connection 408 to perform the data transmission to the wireless device 404.

The coordinating device 410 may perform any necessary coordination operations while 60 GHz high speed data connection 408 is being setup, and during the data transmission. The wireless devices 402 and 404 may be enabled to transmit and/or to receive control messages. The wireless device 402 and 404 may setup low rate control connection 406a and 406b to communicate with the coordinating device 410. Secondary MAC/PHY layers may be utilizing in establishing the low rate control connections 406a and 406b, substantially as described in FIG. 1 and FIG. 2. For example, use of the Bluetooth, 802.11, and/or UWB may enable utilizing omni-directional antennas and/or CSMA/CA to gain access to the coordinating device 410. Once the low rate control connections 406a and 406b are established, the coordinating device 410 may perform any coordinating operations to ensure the establishment of the 60 GHz high speed data connection 408. For example, the coordinating device 410 may utilize frequency coordination, time coordination, and/or spatial coordination to ensure that the wireless devices 402 and 404 may be enabled to communicate successfully via the 60 GHz interface and/or that there may be no interference caused to/by other wireless devices that may be located within operation proximity of the wireless devices 402 and 404.

During the data transmission, the coordinating device 410 may continue to provide any necessary coordination. For example, where frequency coordinating may have been utilized during the initial setup of the 60 GHz high speed data connection 408, the coordinating device 410 may dynamically determine that there is a need to change to a different frequency. The coordinating device 410 may utilize the low rate control connections 406a and 406b to communicate with the wireless devices 402 and 404 to deallocate the frequency assigned during the initial setup of the 60 GHz high speed data connection 408, and/or to assign a new frequency to may be utilized to perform data transmission via the 60 GHz high speed data connection 408.

Figure 5:
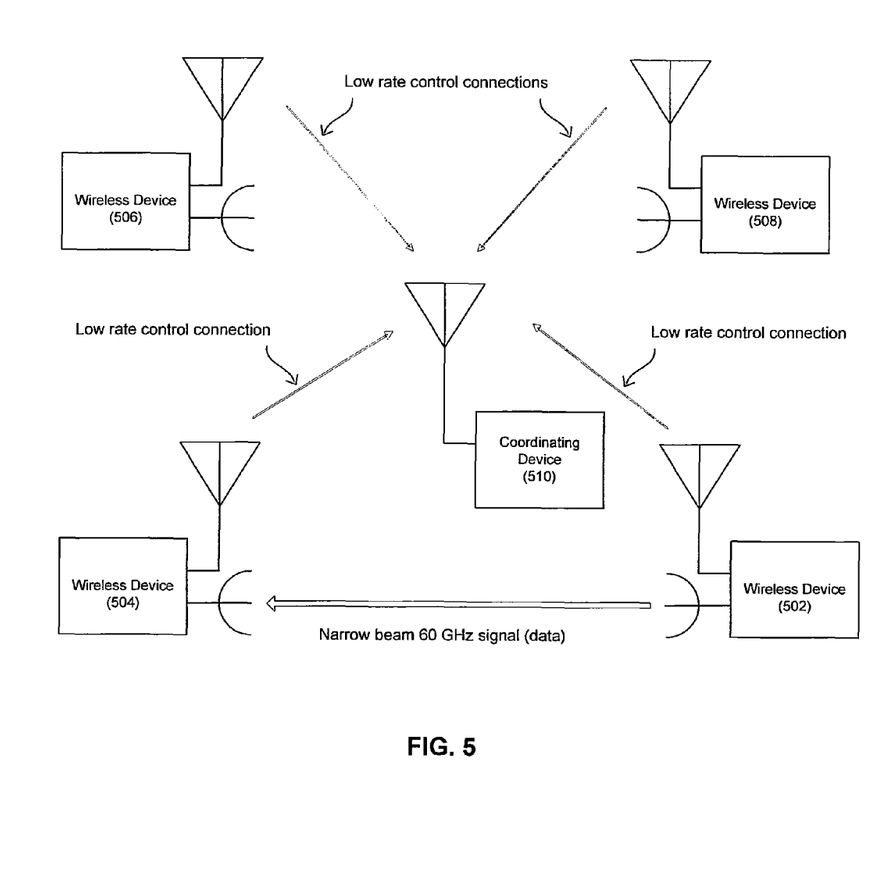
FIG. 5 is a block diagram illustrating a coordinating device utilizing low rate MAC/PHY to coordinate a plurality of wireless devices that utilize directional antennas while transmitting high speed data via 60 GHz physical layers, in accordance with an embodiment of the invention.

FIG. 5 is a block diagram illustrating a coordinating device utilizing low rate MAC/PHY to coordinate a plurality of wireless devices that utilize directional antennas while transmitting high speed data via 60 GHz physical layers, in accordance with an embodiment of the invention. Referring to FIG. 5, there is shown wireless devices 502, 504, 506, and 508, and a coordinating device 510.

The wireless devices 502, 504, 506, and 508 may comprise components and/or functionality that may be substantially similar to the wireless devices 402 and/or 404. The coordinating device 510 may be substantially comprises similar to the coordinating device 410.

In operation, the coordinating device 510 may coordinate 60 GHz high speed data transmission between each pair of the plurality of the wireless devices 502, 504, 506, and 508, substantially similar to the coordinating device 410 as described in FIG. 4. Each of the plurality of the wireless devices 502, 504, 506, and 508 may constantly communicate, via their respective low rate control connections, reporting messages to the coordinating device 510. The reporting messages may comprise information pertaining to the availability and/or use of physical layers within each of the plurality of wireless devices 502, 504, 506, and 508. The coordinating device 510 may utilize the reporting message to maintain tables of available resources that may be utilized during 60 GHz high speed data transmissions. For example, the coordinating device 510 may maintain a table of time slots and frequency slots to determine potentially when different wireless device pairs may be allowed to use the 60 GHz connection.

In instances where the wireless device 502 may need to transmit data to the wireless device 504, the coordinating device 510 may utilize information compiled based on reporting messages sent from each of the plurality of the wireless devices 502, 504, 506, and 508 to enable establishment of the 60 GHz connection between the wireless device 502 and 504. For example, the coordinating device 510 may utilize tables of available and/or used time slots, and/or frequency slots, which may be assigned to the wireless devices 502 and 504 for establishing the 60 GHz connection. Additionally, the coordinating device 510 may enable the wireless devices 502 and 504 to align and/or position their directional antennas to ensure establishment of the 60 GHz connection between the two devices. The directional antennas, time slot assignments and/or frequency assignments may be dynamically changed in order to provide optimized performance which may be measured by, for example, throughput, bit error rate (BER), packet error rate (PER), signal to noise ratio (SNR), and/or received signal strength (RSSI).

Since each of the plurality of wireless devices 502, 504, 506, and 508 may continually send reporting messages to the coordinating device 510, the coordinating device 510 may perform coordination operations during data transmission. For example, reporting messages sent from the wireless devices 506 and/or 508 may cause the coordinating device 510 to change time slot and/or frequency slot that may initially be assigned to the wireless devices 502 and 504. The change may be aimed at preventing or mitigating interference caused to and/or by the wireless devices 506 and/or 508 due to the 60 GHz data transmission between the wireless devices 502 and 504.

Figure 6:
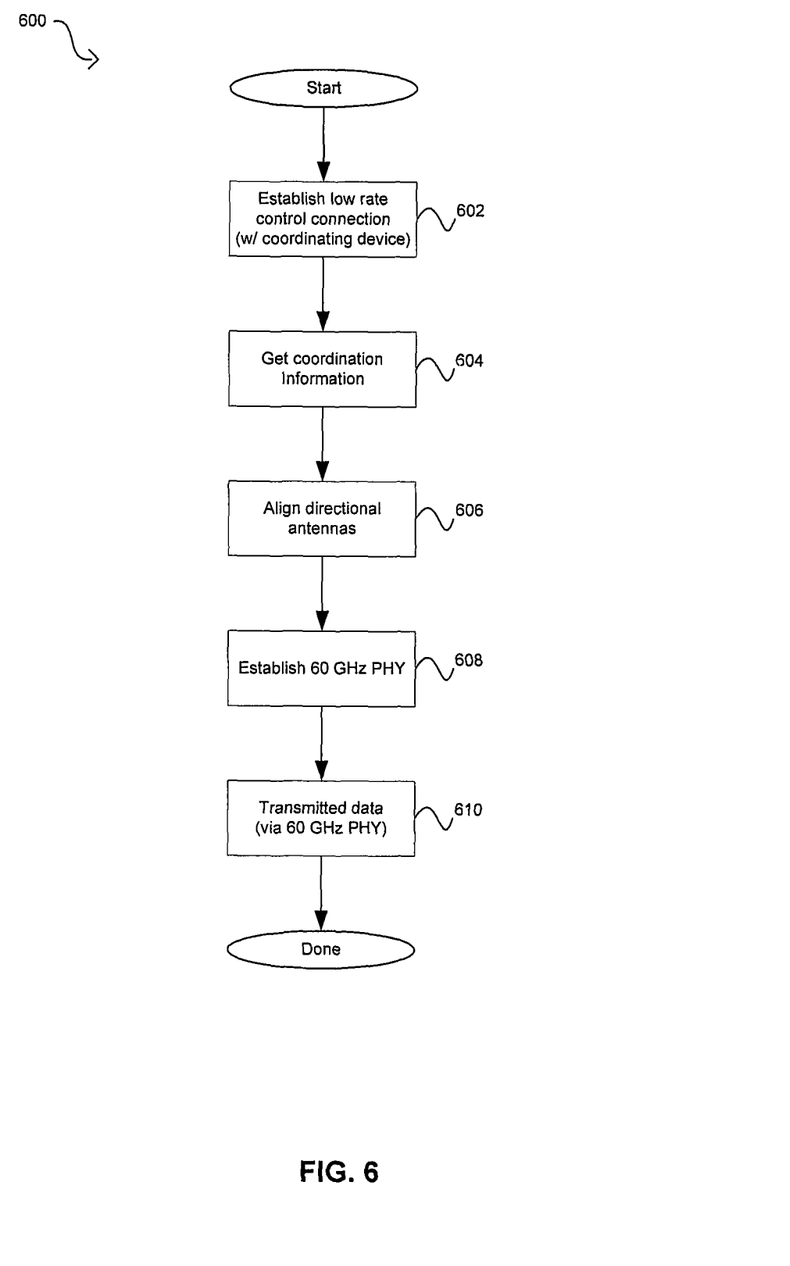
FIG. 6 is a flow diagram illustrating a system comprising coordinating device controlling, via a low rate MAC/PHY, a plurality of wireless devices that transmit high speed data via 60 GHz physical layers, in accordance with an embodiment of the invention.

FIG. 6 is a flow diagram illustrating a system comprising coordinating device controlling, via a low rate MAC/PHY, a plurality of wireless devices that transmit high speed data via 60 GHz physical layers, in accordance with an embodiment of the invention. Referring to FIG. 6, there is shown a flow chart 600 comprising a plurality of exemplary steps. The flow chart may start when a wireless device may need to transmit data via a high speed connection. In step 602, the wireless device may establish a low rate control connection with a coordinating device. The wireless device may utilize one or more wireless protocols that may comprise, Bluetooth, WLAN (802.11) and/or Ultra-Wideband (UWB). For example, the wireless device 402 may utilize legacy Bluetooth stack comprising the Bluetooth core 204, the Bluetooth HCI 210, the Bluetooth HCI Link management layer 212, and the Bluetooth radio; the 802.11 PAL/HCI 216, the 802.11 MAC layer 218, and the 802.11 PHY layer 220; or the UWB HCI 222, the UWB MAC layer 224, and the UWB PHY layer 226 to establish the low rate control connection.

In step 604, coordination information may be communicated between the wireless device and the coordinating device. For example, the wireless device 402 and/or the coordinating device 410 may utilizing the low rate control connection to send and/or receive message that may enable establishing high speed data connection. Messages sent from the wireless device 402 may comprise information pertaining to the data transmission including such information as requested/needed QOS. Messages sent from the coordinating device 410 may comprise information pertaining to time and/or frequency assignment, and/or spatial information that may be utilized by the wireless device 402 in establishing high speed data connection.

In step 606, directional antennas may be aligned. Directional antennas may be utilized during 60 GHz transmission. In this regard, a pair of wireless devices utilizing 60 GHz for high speed data transmission may need to align their directional antennas to facilitate the communication. For example, the wireless devices 402 may utilize coordination information received from the coordinating device 410, via the low rate control connection, to align and/or position its directional antennas to ensure establishment of the 60 GHz high speed data connection. In step 608, the 60 GHz physical layer that may be utilized for high speed data transmission may be established. For example, the wireless device 402 may utilize the Bluetooth stack 200 to establish 60 GHz connection with the wireless device 404 via the 60 GHz PAL/HCI 228, the 60 GHz MAC layer 230, and the 60 GHz PHY layer 232. In step 610, high speed transmission may be performed via the 60 GHz physical layer established in step 610. In another embodiment of the invention, the wireless devices may continually send reporting messages to the coordinating device. In this regard, the coordinating device may perform coordination operations during data transmission. For example, during data transmission in step 610, the coordinating device 410 may receive reporting messages from the wireless device 402 and/or other wireless devices in operational proximity of the coordinating device 410. Based on the received reporting messages, the coordinating device 410 may send the wireless device 402 control messages to deallocation and/or reallocate time slot and/or frequency slot that may initially be assigned to the wireless device 402. The change may be aimed at preventing interfaced caused to/by the wireless device 402.

Various embodiments of the invention may comprise a method and system for low rate MAC/PHY for 60 GHz transmission. The plurality of wireless devices 502, 504, 506, and 508 may utilize 60 GHz interface for high speed data transmission. Each of the wireless devices 502, 504, 506, and 508 may also comprise a plurality of available secondary physical layers comprising, Bluetooth, WLAN (802.11), and/or Ultra Wideband (UWB) layers. The coordinating device 510 may be utilized to control high speed data transmission within the plurality of wireless devices 502, 504, 506, and 508. Low rate control connections maybe established between each of plurality of wireless devices 502, 504, 506, and 508 and the coordinating device 510. The low rate control connections may be established via said available secondary physical layers. The low rate control connections may be utilized to send and/or receive control messages that enable the coordinating device 510 to perform time coordination, frequency coordination, and/or spatial coordination of the plurality of wireless devices 502, 504, 506, and 508. The coordinating device 510 may enable the wireless devices 502, 504, 506, and 508 to align and/or position their directional antennas during 60 GHz high speed data transmissions.

The wireless devices 502, 504, 506, and 508 may utilize the low rate control connections to communicate reporting messages to the coordinating device 510. The reporting information may comprise information pertaining to availability of the resources within each of wireless devices 502, 504, 506, and 508, which may be utilized to facilitate 60 GHz data transmission. The reporting information may enable the coordinating device 510 to manage available resources in the plurality of wireless devices 502, 504, 506, and 508 by maintaining tables of current available resources, and/or to deallocation/reallocation resource during 60 GHz high speed data transmissions.

Another embodiment of the invention may provide a machine-readable storage, having stored thereon, a computer program having at least one code section executable by a machine, thereby causing the machine to perform the steps as described herein for low rate MAC/PHY for 60 GHz transmission.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for wireless communication, the method comprising:
    setting up a 60 GHz data transmission session between a plurality of wireless communication devices under control of a third wireless device acting as a controller, each of said plurality of wireless communication devices including a 60 GHz first physical layer, wherein setting up the 60 GHz data transmission session includes:
        performing a discovery operation using one or more secondary physical layers different from the 60 GHz first physical layer; and
    controlling, by the controller, the 60 GHz data transmission session between the plurality of wireless devices during the 60 GHz data transmission session, wherein the controlling includes:
        exchanging control signals between the controller and the plurality of wireless communication devices via the one or more secondary physical layers, wherein the control signals include control signals related to the 60 GHz data transmission session.

2. The method of claim 1, wherein said plurality of wireless devices are operable to perform said 60 GHz data transmission session via one or more directional antennas.

3. The method of claim 1, wherein said controlling comprises utilizing omni-directional antennas at said plurality of wireless devices during said exchanging of said control signals.

4. The method of claim 1, comprising managing available resources utilized during said 60 GHz data transmission session.

5. The method of claim 4, wherein said managing of said available resources comprises allocating, deallocating, and/or reallocating of said available resources.

6. The method of claim 4, wherein said available resources comprise one or more of available channels within the 60 GHz physical layer during said 60 GHz data transmission session.

7. The method of claim 4, wherein said available resources comprise one or more of available time slots within the 60 GHz physical layer during said 60 GHz data transmission session.

8. The method of claim 2, comprising coordinating by a coordinating device, positioning of said directional antennas of each pair of said plurality of wireless devices to enable said 60 GHz data transmission session and to prevent interference by one or more of said plurality of wireless devices.

9. The method of claim 1, wherein said one or more secondary physical layers comprise Bluetooth (IEEE 802.15), WLAN (IEEE 802.11), and/or Ultra Wideband (UWB) physical layers.

10. The method of claim 1, wherein the plurality of wireless communication devices includes a coordinating device, said coordinating device comprises an access point, a set-top box, a gaming console, or a residential gateway device.

11. The method according to claim 1, wherein said controlling comprises communicating via said one or more secondary physical layers, information between one or more of said plurality of wireless devices that enable said controlling of said 60 GHz data transmission session.

12. The method according to claim 1, wherein said control signals are related to one or more of a bit error rate (BER), a packet error rate (PER), a signal to noise ratio (SNR), and a received signal strength indication (RSSI).

13. A system for wireless communication, the system comprising:
one or more circuits included in a controller, the one or more circuits configured to set up a 60 GHz data transmission session between a plurality of wireless communication devices, each of said plurality of wireless communication devices including a 60 GHz first physical layer, wherein setting up the 60 GHz data transmission session includes:
performing a discovery operation using one or more secondary physical layers different from the 60 GHz first physical layer; and
one or more circuits of the controller configured to control the 60 GHz data transmission session between the plurality of wireless devices during the 60 GHz data transmission session, wherein the controlling includes:
exchanging control signals between the plurality of wireless communication devices and the controller via the one or more secondary physical layers, wherein the control signals include control signals related to the 60 GHz data transmission session.

14. The system of claim 13, wherein said plurality of wireless devices are operable to perform said 60 GHz data transmission session via one or more directional antennas.

15. The system of claim 13, wherein said controlling comprises utilizing omni-directional antennas at said plurality of wireless devices during said exchanging of said control signals.

16. The system of claim 13, wherein said one or more circuits are operable to manage available resources utilized during said 60 GHz data transmission session.

17. The system of claim 16, wherein said managing of said available resources comprises allocating, deallocating, and/or reallocating of said available resources.

18. The system of claim 16, wherein said available resources comprise one or more of available channels within the 60 GHz physical layer during said 60 GHz data transmission session.

19. The system of claim 16, wherein said available resources comprise one or more of available time slots within the 60 GHz physical layer during said 60 GHz data transmission session.

20. The system of claim 14, wherein said one or more circuits are operable to coordinate positioning of said directional antennas of each pair of said plurality of wireless devices to enable said 60 GHz data transmission session and to prevent interference by one or more of said plurality of wireless devices.

21. The system of claim 13, wherein said one or more secondary physical layers comprise Bluetooth (IEEE 802.15), WLAN (IEEE 802.11), and/or Ultra Wideband (UWB) physical layers.

22. The system of claim 13, wherein the plurality of wireless communication devices includes a coordinating device, said coordinating device comprises an access point, a set-top box, a gaming console, or a residential gateway device.

23. The system according to claim 13, wherein said controlling comprises communicating via said one or more secondary physical layers, information between one or more of said plurality of wireless devices that enable said controlling of said 60 GHz data transmission session.

24. The system according to claim 13, wherein said control signals are related to one or more of a bit error rate (BER), a packet error rate (PER), a signal to noise ratio (SNR), and a received signal strength indication (RSSI).

25. A system comprising:
one or more circuits for use in a wireless controller device that comprises an omni-directional antenna and a directional antenna, said one or more circuits being operable to:
set up a 60 GHz data transmission session between a plurality of wireless communication devices, each of said plurality of wireless communication devices including a 60 GHz first physical layer, wherein setting up the 60 GHz data transmission session includes:
performing a discovery operation using one or more secondary physical layers different from the 60 GHz first physical layer, wherein the discovery operation uses the omni-directional antenna; and
one or more circuits of the controller configured to control the 60 GHz data transmission session between the plurality of wireless devices during the 60 GHz data transmission session, wherein the controlling includes:
exchanging control signals between the plurality of wireless communication devices and the controller via the one or more secondary physical layers, wherein the control signals include control signals related to the 60 GHz data transmission session, and wherein the 60 GHz data transmission session uses the directional antenna.

26. The wireless system of claim 25, comprising controlling said 60 GHz data transmission session via said first, 60 GHz physical layer based on at least some of said control signals communicated via said one or more secondary physical layers different from the 60 GHz first physical layer.

* * * * *